United States Patent
Carreras et al.

(10) Patent No.: US 6,752,502 B2
(45) Date of Patent: Jun. 22, 2004

(54) PARABOLIC MEMBRANE MIRROR HAVING A SHAPE-RESTORATIVE FORCE

(75) Inventors: Richard A. Carreras, Albuquerque, NM (US); Dan K. Marker, Albuquerque, NM (US); James M. Wilkes, Sandia Park, NM (US); Dennis Duneman, Albuquerque, NM (US); James R. Rotge, Albuquerque, NM (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 10/391,319

(22) Filed: Mar. 17, 2003

(65) Prior Publication Data

US 2003/0223135 A1 Dec. 4, 2003

Related U.S. Application Data

(62) Division of application No. 09/681,581, filed on May 2, 2001, now Pat. No. 6,533,426.

(51) Int. Cl.$^7$ .............................. G02B 7/188; G02B 5/08
(52) U.S. Cl. ...................... 359/847; 359/582; 359/838; 359/846
(58) Field of Search ......................... 264/1.9, 2.1, 298, 264/299, 310, 311; 359/838, 846, 847, 883, 582, 584, 585, 900

(56) References Cited

U.S. PATENT DOCUMENTS

| | | | |
|---|---|---|---|
| 669,119 A | 3/1901 | Krank | |
| 3,010,153 A | 11/1961 | Bittner | |
| 3,274,301 A | 9/1966 | Kulp, Jr. | |
| 3,577,323 A | 5/1971 | Pichel | |
| 3,691,263 A | 9/1972 | Stoy et al. | |
| 5,583,704 A | 12/1996 | Fujii | |
| 6,254,243 B1 | 7/2001 | Scrivens | |
| 6,438,149 B1 * | 8/2002 | Tayebati et al. | 372/45 |
| 6,545,385 B2 * | 4/2003 | Miller et al. | 310/309 |
| 2001/0030820 A1 | 10/2001 | Scrivens | |

FOREIGN PATENT DOCUMENTS

| | | |
|---|---|---|
| DE | 3007350 A | 9/1981 |
| FR | 2121434 | 8/1972 |
| FR | 2506751 | 12/1982 |
| JP | 61-186230 A | 8/1986 |

OTHER PUBLICATIONS

R.L. Richardson, et al., "Generation of front–surface low–mass epoxy–composite mirrors by spin–casting", Optical Engineering 40(2), pp. 252–258, Feb. 2001.*

* cited by examiner

*Primary Examiner*—John Juba, Jr.
(74) *Attorney, Agent, or Firm*—James M. Skarich; Kenneth E. Callahan

(57) ABSTRACT

An optical quality, freestanding, compliant membrane mirror is cast with a concave parabolic shape, and includes a substrate and a reflective stress coating. The stress coating is in compression and applies a tensile shear stress to the substrate that opposes and offsets the intrinsic stress in the substrate that would otherwise decrease the concavity. The stress coating generates a force to restore the membrane mirror to its cast concave parabolic shape when an external force deforms the mirror.

10 Claims, 2 Drawing Sheets

PARABOLIC MEMBRANE MIRROR HAVING A SHAPE-RESTORATIVE FORCE

This application is a division of pending U.S. application Ser. No. 09/681,581 filed on May 2, 2001, now U.S. Pat. No. 6,533,426, and claims the benefit of the foregoing filing date.

FEDERAL RESEARCH STATEMENT

The conditions under which this invention was made are such as to entitle the Government of the United States under paragraph I(a) of Executive Order 10096, as represented by the Secretary of the Air Force, to the entire right, title and interest therein, including foreign rights.

BACKGROUND OF THE INVENTION

This invention is in the field of very large optical apertures, and in particular in the use of shape-retaining thin film membrane mirrors of optical quality.

Various focusing mirror systems fabricated from a reflective metallized membrane are known in the prior art. Commonly, a differential pressure is established between an enclosed area behind the reflective surface and the ambient pressure to control the contour of the flexible reflective surface. The curvature is controlled by various means, such as: an electropneumatic control system (U.S. Pat. No. 4,179,193); an actuator pushing or pulling on a rear membrane (U.S. Pat. No. 5,016,998): an actuator in physical contact with the rear surface of the membrane (U.S. Pat. No. 4,422,723); a double membrane with a partial vacuum between with a complex edge tensioning system to vary the curvature (U.S. Pat. Nos. 5,680,262 and 5,552,006); and a curvature determined by uniform differential pressure applied to a membrane with a non-uniform radial distribution of thickness or a uniform membrane loaded with a non-uniform differential pressure obtained by localized electrostatic or magnetic pressure (U.S. Pat. No. 4,046,462).

Most of the aforementioned inventions are designed for solar energy concentrators. The surfaces obtained do not approach the optical quality required of an astronomical telescope. The next step toward imaging quality are telescopes having less than ~200 waves of low-spatial-frequency surface error. Telescopes having this level of surface error can be compensated with real time monochromatic holography, requiring spatial light modulator resolutions of no more than 40 lines per mm. This situation should produce a near-diffraction limited image. Very large optical apertures, particularly for space-based systems, could benefit from lightweight, optical quality membrane mirrors. Potential applications include astronomy, imaging and surveillance, and laser beam projection.

Optical quality membrane mirrors have been demonstrated (U.S. Pat. No. 6,113,242) wherein a film is mounted on an optically flat circular ring and stretched over a smaller optically flat circular ring. Pressure or vacuum is separately applied to both the inner disk and the outer annulus to produce a doubly-curved optical quality surface in the inner disk. In the atmosphere, pulling a partial vacuum on the underside of the membrane mirror creates a pressure differential. For use in space, a pressure chamber that is bounded by the mirrored surface and a clear polyimide sheet creates the curvature of the optic. The combination of these two sheets is referred to as a lenticular. The use of a clear sheet or inflatable canopy to maintain the necessary pressure to deform the membrane in space entails several problems. Large strains are required, which can put undue structural requirements on the supporting structure. In addition, the canopy itself can refract the incoming radiation or otherwise interfere with various potential missions, such as laser beam propagation.

It is an object of the present invention to provide an optical quality parabolic membrane mirror for use in space that can be collapsed for launch and resume its shape when deployed in space.

SUMMARY OF THE INVENTION

A very large aperture optical membrane mirror for use in space is disclosed along with its method of fabrication. The membrane substrate material is first cast on a spinning, inverted (i.e. concave) mandrel that has the basic desired shaped (i.e., parabolic). Stress-inducing and optically reflective coatings are applied after the substrate has cured. This insures that the membrane mirror keeps its shape after it is detached from the mandrel, and provides a highly reflective surface for the operating wavelength band. A rim structure can be attached to the membrane while still in the mandrel for attachment to other structures.

BRIEF DESCRIPTION OF THE DRAWINGS

The various features of novelty that characterize the invention are specifically pointed out in the claims annexed to and forming a part of this disclosure. For a better understanding of the invention, its operating advantages, and specific objects attained by its uses, reference is made to the accompanying drawings and descriptive matter in which a preferred embodiment of the invention is illustrated.

DETAILED DESCRIPTION

A large aperture membrane mirror for space-based optical applications is disclosed along with a method for fabricating it. Basically, the membrane mirror substrate material is cast on a spinning, inverted mandrel to impart the basic parabolic shape desired. Optically reflective and stress-inducing coatings are then applied to insure the membrane mirror is highly reflective and returns to the desired shape after deployment.

When a liquid contained in a cylindrical enclosure is rotated about the cylindrical axis, the liquid surface takes the shape of a parabola. The idea of using this effect with mercury to create a large reflective surface originated at the University of Laval. This effect has also been used, for example, at the University of Arizona to create a large glass telescope mirror blank by allowing molten glass to slowly cool while rotating.

Figure 1:
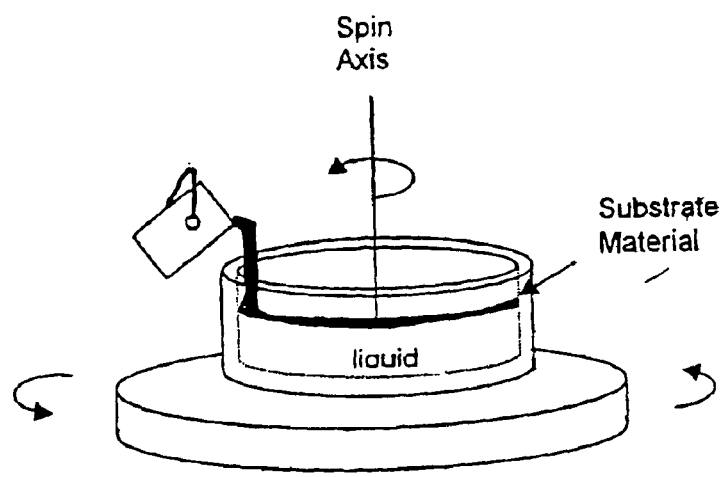
FIG. 1 illustrates the spinning inverted mandrel method with the fast curing substrate material being added.

In the present invention, the rotating liquid is used as an inverted mandrel into which is poured a hard curing liquid to form the membrane mirror substrate (FIG. 1). For example, water might be used in the spinning container and a fast curing liquid polymer used as the membrane mirror substrate, e.g., LaRC™-CP1, which is the trademark describing a clear, solvent-based, evaporative-curling polymide produced by SRS Technologies, Inc., of Huntsville, Ala. This method has several advantages over a regular mandrel method. The irregularities of the mandrel will not be impressed upon the surface of the reflective (top) side of the membrane. In addition, this method is affordable and scalable to very large diameters of the membrane mirror.

Simply creating a large parabolic-shaped film is not sufficient, however. Boundary control and in-plane stresses are needed to uniquely determine the shape of the membrane mirror. A certain amount of in-plane strain is required for an optical membrane to perform optimally. Additionally, a global stress state must be imposed, allowing small movements of the inner and outer boundary to influence the overall shape of the mirror. Hence, the substrate membrane must be strained into its final configuration. A variety of technologies and techniques afford an opportunity to stress the membrane. Examples are inflation, boundary manipulation, shape memory alloys, electrostatic control, piezoelectric or bi-morph material, hydrostatic forces, rotational forces, stress coatings and others. In the present invention, optical stress coatings are applied to exert the necessary in-plane stress to the membrane. The stress coating will have an intrinsic stress that will tend to decrease the membrane concavity. To accomplish this, the stress coating will be in compression and apply a tensile shear stress to the substrate membrane. This gives the membrane a unique deterministic shape while maintaining the flexibility to be packaged for transport into orbit and to return to its desired shape once unpacked. The negative effects of optical coating stress are well-understood, and have been studied and documented for years by optical coatings experts. Now this knowledge will be applied to finalizing the figure for a near-optimal-shape film.

Figure 2:
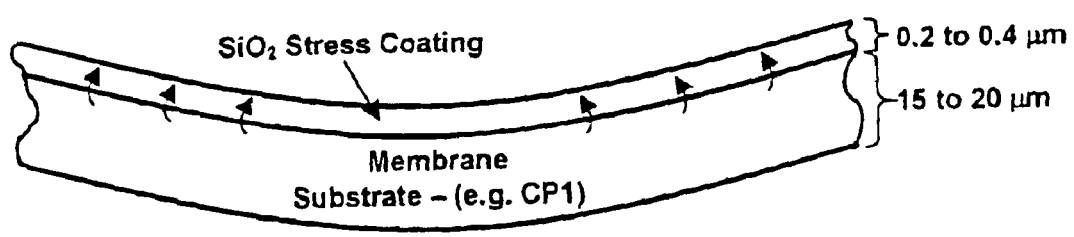
FIG. 2 shows a cross-section of the substrate membrane and stress coating.

Once the membrane substrate material has hardened, a reflective optical stress coating is applied to the substrate material, prior to removing the membrane substrate from the inverted mandrel, to stiffen the membrane (FIG. 2). The thickness of the membrane substrate is on the order of a few tens of micrometers, e.g., from 15 to 20 $\mu$m, and provides insufficient stiffness to maintain the desired parabolic shape upon removal from the mandrel. A variety of stress coatings can be applied, e.g., $SiO_2$ Zirconia/Silica. In addition, these stress coatings can be applied several times to increase the thickness as necessary to maintain the desired shape e.g., from 0.2 to 0.4 $\mu$m.

Figure 3:
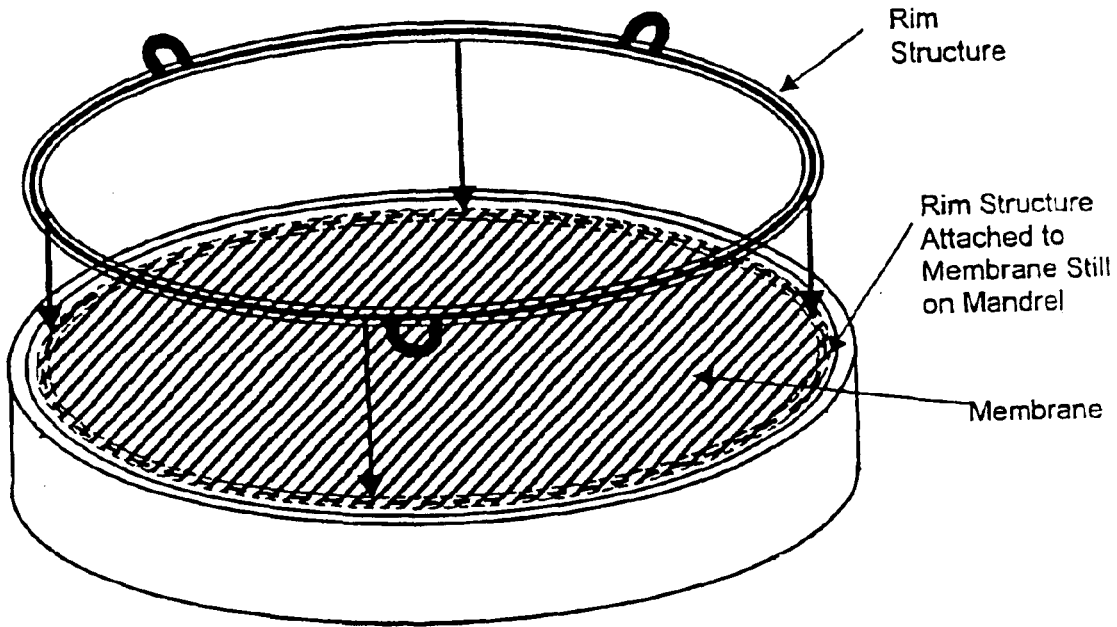
FIG. 3 illustrates the ring structure being attached to the membrane in the mandrel.
Figure 4:
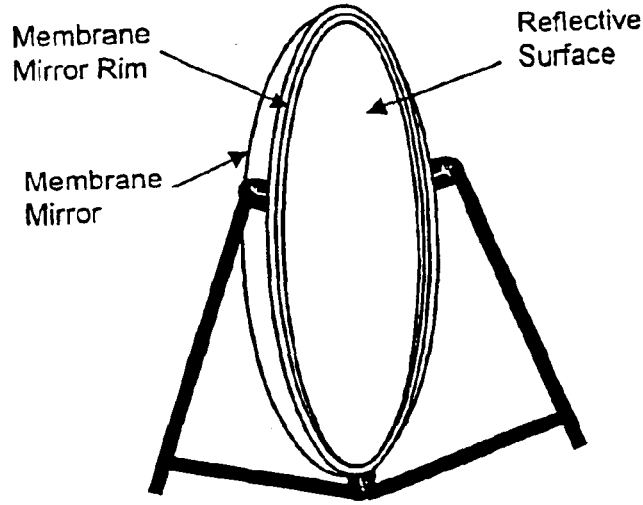
FIG. 4 shows the free-standing parabolic membrane mirror held by the ring structure.

A ring structure can then be attached to the outer rim of the membrane mirror and the membrane mirror removed from the mandrel (FIG. 3). In this way one obtains a free-standing, compliant parabolic membrane mirror (FIG. 4).

While a diffraction-limited optical surface can only be approached with this membrane mirror, very good optical tolerances can be produced. Adaptive optics image correction techniques can be used on large space telescopes to compensate for any slight irregularities.

What is claimed is:

1. A flexible membrane mirror having a cast concavity, comprising:

a substrate having an intrinsic stress tending to decrease the cast concavity;

a stress coating applied to the substrate; and the stress coating being in compression and applying a tensile shear stress to the substrate that opposes and offsets the intrinsic substrate stress, whereby the cast concavity is maintained in the absence of a force acting on the mirror.

2. The flexible membrane mirror as defined in claim 1 wherein the stress coating is also for generating a restorative force to restore the cast concavity after the cast concavity has been changed by a force acting on the mirror.

3. The membrane as defined in claim 2 wherein:

the substrate has a substrate thickness;

the stress coating has a coating thickness; and the coating thickness is less than the substrate thickness.

4. The membrane mirror as defined in claim 3 wherein the coating thickness is from 0.2 to 0.4 micrometers.

5. The membrane mirror as defined in claim 3 wherein the stress coating is optically reflective.

6. The membrane mirror as defined in claim 3 wherein the substrate thickness is from 15 to 20 micrometers.

7. The membrane mirror as defined in claim 3 wherein the stress coating is at least one layer comprising a material selected from the group consisting of $SiO_2$ and $ZrO_2$.

8. The membrane mirror as defined in claim 3 wherein the substrate is transparent.

9. The membrane mirror as defined in claim 3 wherein the substrate is centrifugally cast.

10. The membrane mirror as defined in claim 3 wherein:

the mirror has a periphery;

and further comprising a ring structure attached to the periphery.

* * * * *